July 15, 1930.  J. F. M. TAYLOR  1,770,559
GRAVITY RECORDING INSTRUMENT
Filed Jan. 18, 1928
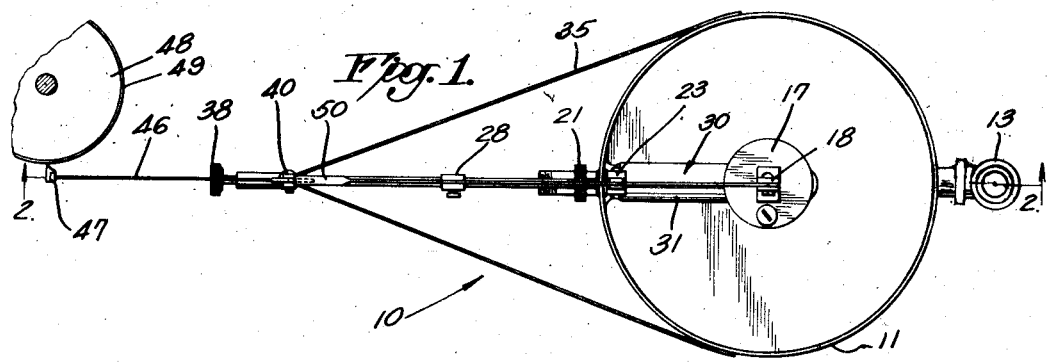
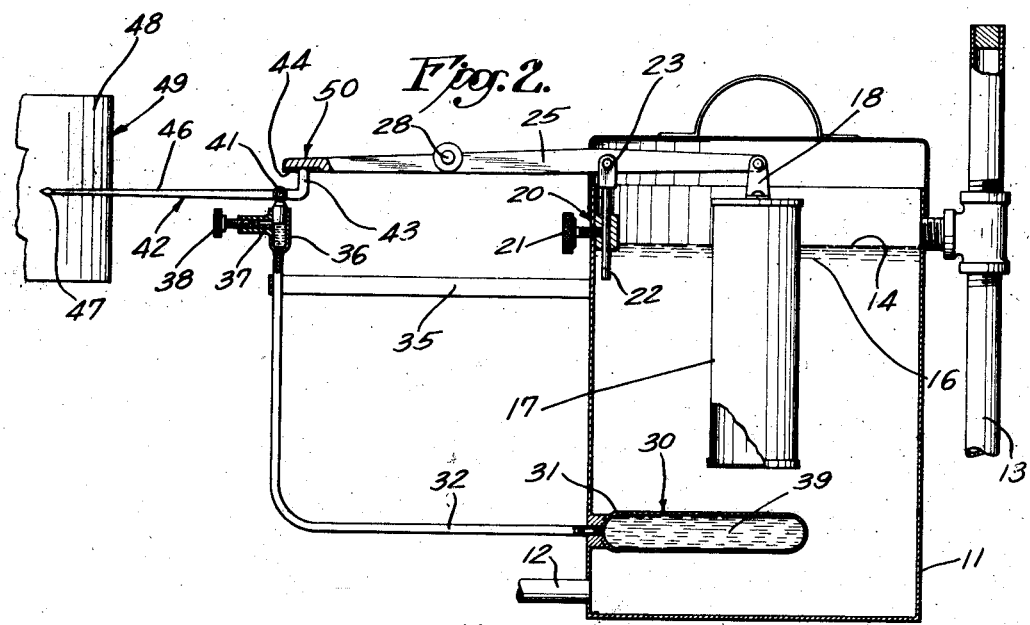
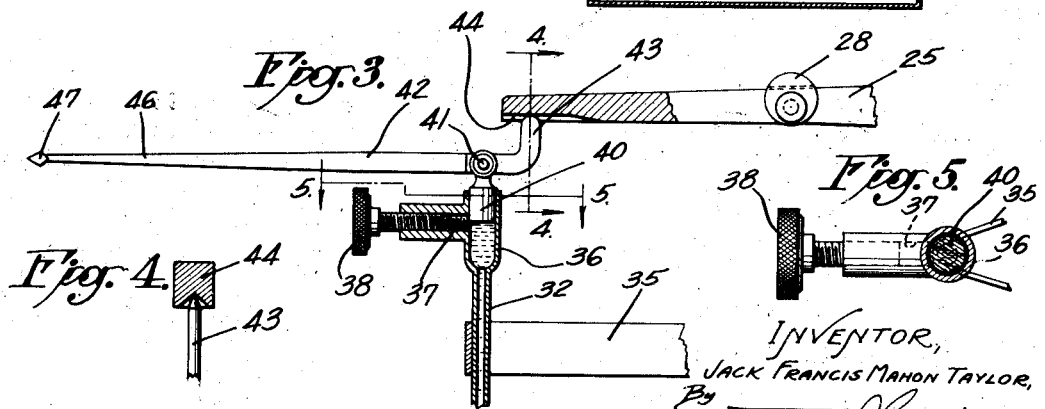
INVENTOR,
JACK FRANCIS MAHON TAYLOR,
By
ATTORNEY.

Patented July 15, 1930

1,770,559

UNITED STATES PATENT OFFICE

JACK FRANCIS MAHON TAYLOR, OF DOMINGUEZ, CALIFORNIA, ASSIGNOR, BY MESNE ASSIGNMENTS, TO SHELL DEVELOPMENT COMPANY, OF SAN FRANCISCO, CALIFORNIA, A CORPORATION OF DELAWARE

GRAVITY-RECORDING INSTRUMENT

Application filed January 18, 1928. Serial No. 247,599.

My invention relates to recording instruments, and it is an object of my invention to provide such an instrument for recording the gravity of a body of liquid.

In many commercial manufacturing processes, such as the production of petroleum distillates, it is extremely important that the specific weight of certain liquids produced be continuously known as these liquids are discharged from the producing apparatus. Usually this specific weight is obtained by taking specific gravity and temperature readings from time to time and computing the gravity for a standard temperature. This method involves a large opportunity for the introduction of error and depends considerably for its results upon the law of averages.

It is an object of my invention to provide a gravity recording instrument in which errors and reliance upon the law of averages are reduced to a minimum.

Another object of my invention is to provide a gravity recording instrument in which a gravity reading is produced which is corrected to indicate the gravity of the liquid tested at a standard temperature.

Yet another object of my invention is to provide a gravity recording instrument in which a corrected reading is continuously produced of the gravity of a liquid which is moving or in which the gravity may be changing owing to other causes.

Further objects and advantages will be made manifest in the following description taken in connection with the accompanying drawings in which:

Fig. 1 is a plan view of a preferred embodiment of my invention.

Fig. 2 is a vertical sectional view taken on the line 2—2 of Fig. 1.

Fig. 3 is an enlarged fragmentary view illustrating a portion of the mechanism of my invention.

Fig. 4 is a vertical sectional view taken on the line 4—4 of Fig. 3.

Fig. 5 is a horizontal sectional view taken on the line 5—5 of Fig. 3.

Referring specifically to the drawings:

The instrument of my invention may be indicated by the numeral 10. The instrument 10 includes a liquid container 11, into which liquid is discharged from a pipe 12 and removed by a pipe 13 so that liquid is maintained in the container with the surface of the liquid at a level 14. Thus, if any liquid is discharged into the container 11 so that the surface of the liquid rises above the level 14, this almost immediately is discharged through the pipe 13.

Extending into a body 16 of liquid thus disposed in the tank is a float 17 preferably formed of a metal tank having a stem 18 extending from the upper end thereof. Mounted in a bracket 20 on a wall of the container 11, which bracket has an adjustment screw 21, is a fulcrum rod 22 having a forked support 23 at its upper end.

Pivotally mounted in the forked support 23, at a point intermediate its ends, and pivotally connected at one of its ends to the stem 18 of the float 17 is a lever 25. Adjustably secured to the arm of the lever 25 on the opposite side of the fulcrum bracket 23 from the float 17 is a counterbalance weight 28.

Provided on the interior of the container 11, just above the mouth of the pipe 12, is a temperature responsive member 30 which includes a bulb 31 having a capillary tube 32 connected therewith. The bulb 31 is filled with a fluid which expands or contracts readily under the influence of temperature changes, this fluid preferably being mercury. The tube 32 extends outward from the container 11, then turns upward to terminate at a point adjacent to the outer end of the lever 25, where this tube is supported by suitable arms 35 extending out from the container 11. In an enlarged upper end of the tube 32 is formed a fulcrum float chamber 36, having a threaded bore 37 extending from one side thereof, there being a screw 38 adjustably threaded into the bore 37.

A sufficient amount of mercury 39 is placed in the temperature responsive device 30 so that the upper level of the mercury is in the fulcrum float chamber 36, opposite the threaded bore 37. Extending downward into the upper end of the fulcrum float chamber 36 is a fulcrum float 40 which sinks into the mercury a sufficient distance to be supported thereby. Pivotally mounted at 41 on the fulcrum float 40 is a recording lever 42 which has a short arm 43 extending upward into a notch 44 formed in the under surface of the outer extremity of the lever 25, and a recording arm 46 having a recording pencil 47 provided upon its extremity. The pencil 47 is adapted to sweep over a recording drum 48 provided with a suitable calibrated chart 49 fitted upon the drum. Suitable mechanism, not shown, rotates the drum 48 at a uniform speed so that the record on the chart accurately indicates the time of the day at which the various readings thereon were made.

The operation of my gravity recording instrument is as follows:

The gravity and the temperature of the liquid 16, passing between the discharging mouth of the pipe 12 and the intake mouth of the pipe 13, are constantly changing. It is desired to measure the gravity of the liquid 16 at the temperature which it has in the container 11, and compute from this gravity the gravity which this liquid would have at a standard temperature. The gravity of the liquid at the temperature at which it passes through the container 11 is measured by the depth to which the float 17 sinks into the liquid 16. The counterbalance weight 28 is adjusted on the lever 25 so as to counterbalance the weight of the float 17 and cause this float to act very sensitively in response to specific gravity changes in the liquid 16. Specific gravity of the liquid 16 is thus measured by a movement of the extreme end 50 of the lever 25 in direct proportion to the changes of gravity of this liquid.

In order to modify the response of the lever end 50 so that the record made upon the chart 49 will indicate the specific gravity of the liquid 16 when the temperature of that liquid has been changed to a standard temperature, the temperature responsive means 30 has been provided. It is clear that as the temperature of the liquid 16 rises, the mercury 39 will expand, raising the level of mercury in the fulcrum float chamber 36. This raises the fulcrum float 40 and the pivot point 41 of the recording lever 42. Therefore, as the specific density of the liquid 16 decreases with a rise in temperature thereof, which causes the float 17 to sink deeper into this liquid and the lever end 50 to therefore rise a certain distance without any change in the absolute density of the liquid itself, the rising of the fulcrum float 40, with an increase in temperature of the liquid 16, merely offsets the tendency of the float 17 to sink deeper into this liquid and causes the recording pencil 47 of the recording arm 42 to remain in substantially the same recording position when the absolute density of the liquid 16 is not increased at the time of a rise in temperature.

In the same manner, when the temperature falls, the specific density of the liquid 16 increases so as to cause the float 17 to rise a slight distance from the liquid which results in the lever end 50 being depressed without the absolute density of the liquid 16 being changed. This depression of the lever end 50 is compensated for by a contraction of the mercury 39 so as to lower the level of mercury in the fulcrum float chamber 36, causing the fulcrum float 40 to be lowered a distance commensurate with the distance which the lever end 50 was depressed by the decrease in temperature of the liquid 16. Thus, instead of the changes of temperature causing a fluctuation of the gravity recorded by the pencil 47, this pencil inscribes a record of the absolute density of the liquid 16, or, in other words, it records the gravity of the liquid 16 passing through the container 11 throughout the day in terms of the gravity which this liquid would have if it were given a standard temperature.

The adjustment screw 21 is for the purpose of adjusting the height of the fulcrum 23. The screw 38 is adapted to increase or lessen the cross-sectional area of the chamber 36 opposite the upper level of the mercury 39 so as to vary the response of the float 40 to a given change in the temperature of the liquid 16. In order to alter the position of the pencil 47 in a vertical direction relative to the chart 49, any suitable adjustment means might be provided such as a vertically extensible mounting for the pivot 41 upon the float 40.

I claim as my invention:

1. In a gravity recording instrument the combination of: a buoyancy responsive member extending into liquid to be tested; a recording member; mechanism connecting said members; and temperature responsive means disposed in close proximity to said liquid, said means being adapted to modify the movement of said recording member relative to said buoyancy member and said connecting mechanism to alter with uniform accuracy an indication to be recorded by said recording member so that said indication is correct for a standard temperature of said liquid.

2. In a gravity recording instrument the combination of: a buoyancy responsive member extending into liquid to be tested; a recording member; lever mechanism connecting said members; and temperature responsive means disposed in close proximity to said liquid, said means being adapted to modify continuously with uniform accuracy the movement of said lever mechanism to alter an indication to be recorded by said recording member so that said indication is correct for a standard temperature of said liquid.

3. In a gravity recording instrument the combination of: a buoyancy responsive member extending into liquid to be tested; a recording member; lever mechanism connecting said members; and temperature responsive means disposed in close proximity to said liquid, said means being adapted to modify the position of a fulcrum of said lever mechanism to alter an indication to be recorded by said recording member so that said indication is correct for a standard temperature of said liquid.

4. In a gravity recording instrument the combination of: a buoyancy responsive member extending into liquid to be tested; recording means; mechanism connecting said member and said means and actuated only by said member; means enclosing a body of temperature responsive fluid in proximity to said liquid; and means directly engaging said recording means, said means being responsive to the volume of said fluid and co-acting with said mechanism to actuate said recording means to produce a record modified to correctly indicate the gravity of said liquid for a standard temperature of said liquid.

5. In a gravity recording instrument the combination of: a buoyancy responsive member extending into liquid to be tested; recording means; a compound lever mechanism connecting said member and said means; means enclosing a body of temperature responsive fluid in proximity to said liquid; and means responsive to the volume of said fluid and co-acting with said mechanism by moving a fulcrum thereof so as to actuate said recording means to produce a record modified to correctly indicate the gravity of said liquid for a standard temperature of said liquid.

6. In a gravity recording instrument the combination of: a buoyancy responsive member extending into liquid to be tested; recording means; a compound lever mechanism connecting said member and said means; means enclosing a body of mercury in proximity to said liquid; and means responsive to the volume of said mercury and including a fluid pressure responsive member connected hydraulically with said mercury and connected to a fulcrum of said mechanism so as to move said fulcrum when the temperature of said liquid changes, thus causing a modification of the action of said recording means so that the record made by said recording means reveals the accurate gravity of said liquid at a standard temperature.

In testimony whereof, I have hereunto set my hand this 13th day of January, 1928.

JACK FRANCIS MAHON TAYLOR.